(12) United States Patent
Swartz et al.

(10) Patent No.: US 12,250,919 B2
(45) Date of Patent: Mar. 18, 2025

(54) SMALL ANIMAL CAGE WITH INTEGRATED CLEANING DOOR

(71) Applicants: Gregory Paul Swartz, Woodland Hills, CA (US); Matthew Siff, Newton, MA (US); Andrew Siff, Newton, MA (US)

(72) Inventors: Gregory Paul Swartz, Woodland Hills, CA (US); Matthew Siff, Newton, MA (US); Andrew Siff, Newton, MA (US)

( * ) Notice: Subject to any disclaimer, the term of this patent is extended or adjusted under 35 U.S.C. 154(b) by 1161 days.

(21) Appl. No.: 17/097,949

(22) Filed: Nov. 13, 2020

(65) Prior Publication Data

US 2021/0144952 A1 May 20, 2021

Related U.S. Application Data

(60) Provisional application No. 62/936,475, filed on Nov. 16, 2019.

(51) Int. Cl.
*A01K 1/01* (2006.01)
*B65F 1/00* (2006.01)
*B65F 1/02* (2006.01)

(52) U.S. Cl.
CPC .............. *A01K 1/01* (2013.01); *B65F 1/0013* (2013.01); *B65F 1/02* (2013.01)

(58) Field of Classification Search
CPC . A01K 1/03; A01K 1/01; A01K 1/034; A01K 31/04
See application file for complete search history.

(56) References Cited

U.S. PATENT DOCUMENTS

| 1,771,492 | A | * | 7/1930 | Karlson | B65D 9/08 |
| | | | | | 119/479 |
| 5,482,005 | A | * | 1/1996 | Thom | A01K 1/034 |
| | | | | | 119/458 |
| 10,709,105 | B1 | * | 7/2020 | Edmonds | A01K 1/029 |
| 2005/0229865 | A1 | * | 10/2005 | Migita | A01K 1/032 |
| | | | | | 119/479 |
| 2005/0235923 | A1 | * | 10/2005 | Niki | A01K 31/04 |
| | | | | | 119/479 |
| 2015/0047572 | A1 | * | 2/2015 | Rybka | A01K 15/02 |
| | | | | | 24/570 |
| 2016/0066533 | A1 | * | 3/2016 | Frigo, III | A01K 1/0103 |
| | | | | | 119/479 |

* cited by examiner

*Primary Examiner* — Yvonne R Abbott-Lewis
(74) *Attorney, Agent, or Firm* — Hamilton, Brook, Smith & Reynolds, P.C.

(57) ABSTRACT

A cage for containing a small animal includes various features adapted to provide a means of cleaning the cage that is fast, easy, and clean, without disassembling, tipping, tilting, or lifting the cage. A panel defining a portion of a cage floor or wall element, or a combination thereof, can be transitioned by a user from a closed state to an open state to reveal an opening, allowing soiled materials to be neatly swept through the opening and directly into a receptacle placed below a portion of the cage containing the opening. A control element coupled to the panel may be provided to allow the user to transition the panel between the closed and open states with minimal manipulation of the cage itself.

30 Claims, 7 Drawing Sheets

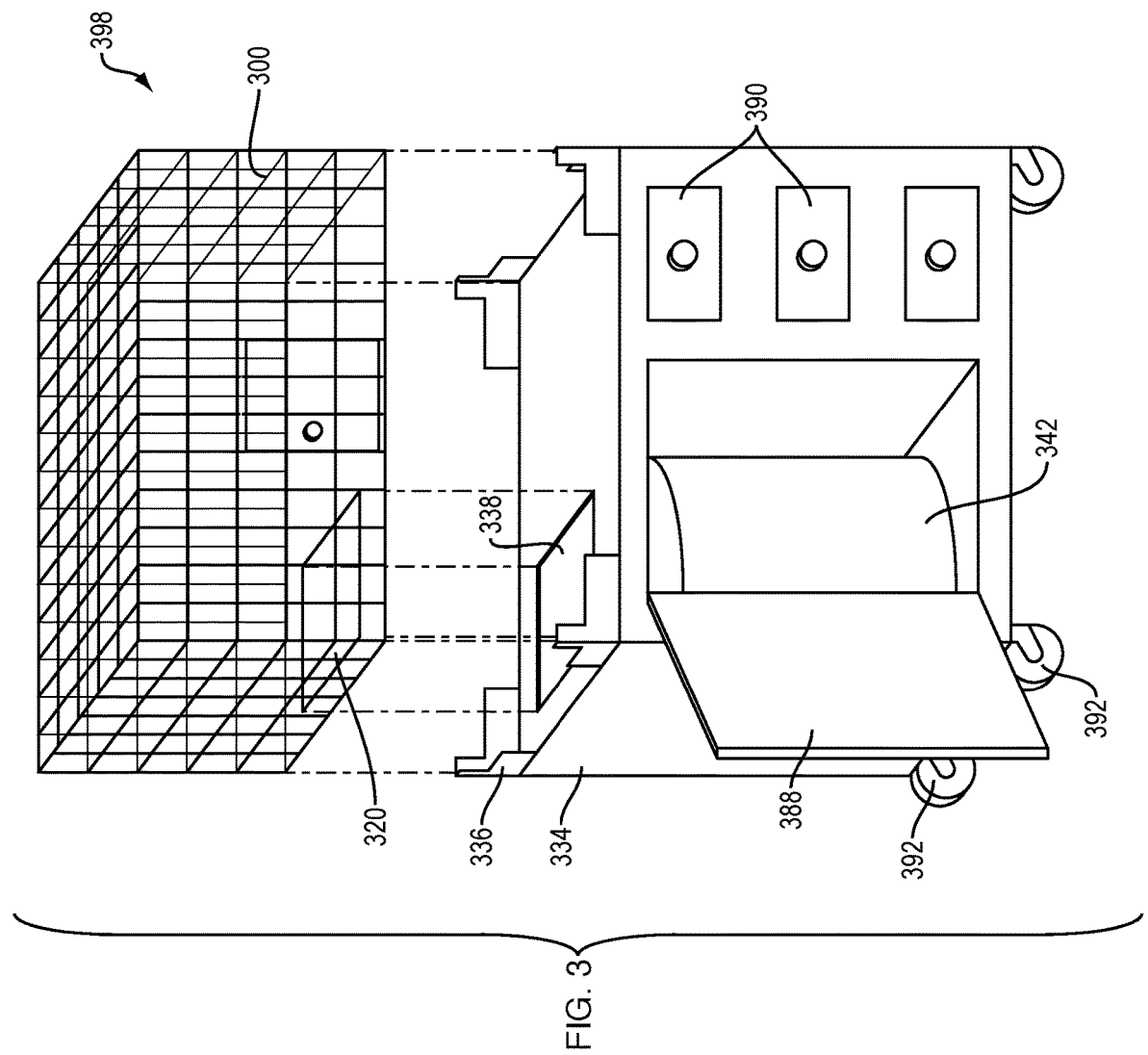

SMALL ANIMAL CAGE WITH INTEGRATED CLEANING DOOR

RELATED APPLICATION

This application claims the benefit of U.S. Provisional Application No. 62/936,475, filed on Nov. 16, 2019. The entire teachings of the above application are incorporated herein by reference.

BACKGROUND

Small animals, such as guinea pigs, hamsters, gerbils, and hedgehogs, are popular household pets. These animals provide valuable companionship, especially for people living alone, while requiring fewer resources and less attention than larger and more cognitively developed animals, such as dogs and cats. Their small size, limited food consumption, and ease of confinement within a cage make these animals particularly practical for people of limited physical capabilities, such as children, the elderly, and the disabled.

Cages used for small animals, however, require frequent cleaning, and for existing cages, the process of cleaning presents numerous challenges. For instance, most cages need to be taken apart so that the basin or lower component can be lifted and dumped inside a trash bag. The process of disassembly can be time-consuming, and the basin can be very heavy when filled with shavings and other material. Additionally, the basin of many cages is too large to fit fully into a trash bag, and basins often have a large lip that impedes the flow of materials into the bag, making it difficult to keep the bag properly positioned. Accidental spillage of unsanitary materials is common.

The industry lacks a comprehensive solution to the above challenges, rendering small pet ownership inconvenient or even out of reach for many people who would otherwise enjoy and benefit from the company of a small pet.

SUMMARY

A pet cage that does not require disassembly and removal from its resting surface for periodic cleaning would be useful. A cage that facilitates complete transfer of soiled materials from the interior of the cage to a trash bag, such that the floor of the pet owner's home remains clean, would also be useful. Embodiments of a cage disclosed herein provide such functionality.

In some embodiments, a cage for housing a small animal includes a basin, defining a floor and wall perimeter, and a wire mesh extending upward from the wall perimeter. The basin and wire mesh define an enclosure volume sufficient to contain a small animal and materials for the small animal. In some embodiments, the cage includes a panel defining a portion of the floor or wall perimeter in a closed state and is configured to enable a user to transition the panel into an open state. The panel in the open state defines an opening through the floor or wall perimeter of sufficient size to allow the user to pass the materials therethrough.

The basin may include a plurality of feet extending downward from the floor of the basin external from the enclosure volume. The plurality of feet may have a height dimension that positions the floor above a surface at a sufficient distance from the surface to enable a user to access the panel or a control element mechanically coupled to the panel to transition the panel between the closed state and the open state. The panel may be slidably operable along a panel track integrated with or coupled to the basin.

The cage may have a length and width with weight distribution biased toward a given side along the length toward the perimeter of the cage at least while the panel is in the open state. The plurality of feet may include at least five feet with a majority of the feet positionally disposed along the length away from the given side. A combination of a location of the panel, bias of the weight distribution, and positions of the majority of the feet may enable the cage to remain in a level orientation, with the floor occupying a plane that is parallel to the surface, while the cage is positioned with the panel in the open state such that the materials can flow freely through the opening without contacting the surface.

The feet may include a mechanism or material to enable the user to translate or rotate the cage on a surface. In one embodiment, the panel defines the opening through the floor of the basin in the open state. In an alternative embodiment, the panel defines the opening through the wall perimeter of the basin. In yet another alternative embodiment, the panel defines the opening through both the floor and wall perimeter of the basin.

The cage may include a cabinet, the basin of dimensions that enable the cage to be positioned atop the cabinet. The cabinet may include one or more vertical members positioned along an outer edge of a top surface of the cabinet, the vertical members configured to limit horizontal movement of the basin across or off of the top surface of the cabinet. The cabinet may include a cabinet-top opening disposed beneath the opening through the floor of the basin to allow materials removed from the basin through the opening through the floor of the basin to flow freely into a garbage bag or other receptacle located internal to the cabinet, the cabinet-top opening having pass-through dimensions matching or greater in size than corresponding dimensions of the opening through the floor of the basin.

The cabinet may include a sliding tray located below the cabinet-top opening while in a retracted state to allow a receptacle positioned on the tray in the retracted state to receive materials removed from the basin through the opening through the floor of the basin, the sliding tray adapted to be translated to an extended state defined by a location at least partially external to the cabinet such that the receptacle may be lifted off of the tray without interference from the cabinet.

The panel may be configured to be at least partially removed from the basin to transition the panel into the open state, and wherein the panel is further configured to be reattached to the basin to transition the panel into the closed state.

The cage may include at least two mechanical features mounted at a location external from the enclosure volume and adjacent to the opening defined by the panel while in the open state. The at least two mechanical features may have shapes that enable a garbage bag or other receptacle to be suspended therefrom and are separated by a distance sufficient to allow the garbage bag or other receptacle attached thereto to receive materials removed from the basin through the opening.

The cage may include a sweeper having bristles of sufficient stiffness to translate materials in the cage along the floor of the basin. The bristles are connected to a shaft at a sweeping end, the shaft including a hook element or a curved section located at a hanging end that is opposite to the sweeping end. The hook element or curved section has a curvature that allows the hook element to suspend the sweeper from a portion of the wire mesh.

A surface of the basin facing the enclosure volume may include a chamfered region adjacent to the opening. The cage may include a rim adjacent to the opening and extending outward beyond a surface of the basin external from the enclosure volume, the rim extending toward a plane occupied by the panel in the closed position.

The wire mesh may be coupled to the basin at a proximal edge. A roof element may be adapted to be positioned on the wire mesh at a distal edge of the wire mesh.

In some embodiments, a cage for containing a small animal includes means for containing the small animal and materials for the small animal in an enclosure volume. The cage also includes means for changing a state of an opening in said means for containing that enables a user to translate the materials or a portion thereof from within the enclosure volume to outside of the enclosure volume without tipping or tilting the cage.

In some embodiments, a kit includes a cage configured to contain a small animal and materials for the small animal in an enclosure volume. The cage may be configured to allow a user to sweep the materials for the small animal out of the enclosure volume through an opening through the cage. The kit includes a sweeper having bristles connected to a shaft at a sweeping end, the shaft including a hook element or a curved section located at a hanging end that is opposite to the sweeping end. The hook element or curved section enables the sweeper to be affixed to the wire mesh. The sweeper is configured to be removed from the wire mesh and employed by the user to sweep the materials for the small animal out of the enclosure volume through the opening through the cage. The kit includes a receptacle configured to be below the opening through the cage to receive materials removed from the cage through the opening of the cage. The receptacle has receptacle in-take dimensions that match dimensions of, or are greater in size than corresponding dimensions of, the opening through the cage. The receptacle may be a bag configured to be affixed to the cage beneath the opening to receive the materials for the small animal. The bag would have a strength sufficient to withstand a predicted weight of the materials while affixed to the cage.

The kit may also include a cabinet. The basin of the cage is configured to enable the cage to rest atop the cabinet. The cabinet may include one or more vertical members positioned along an outer edge of a top surface of the cabinet and configured to limit horizontal movement of the cage across or off of the top surface of the cabinet. The cabinet may include a cabinet-top opening disposed beneath the opening through the cage to allow materials removed from the cage through the opening through the cage to flow freely into the bag or other receptacle located internal to the cabinet, the cabinet-top opening having pass-through dimensions matching or of greater size than corresponding dimensions of the opening through the cage.

In some embodiments, a system for housing a small animal includes a cage and a cabinet. The cage includes a basin defining a floor and wall perimeter and a wire mesh extending upward from the wall perimeter. The basin and wire mesh define an enclosure volume sufficient to contain a small animal and materials for the small animal. The cage includes a panel defining a portion of the floor or wall perimeter in a closed state and configured to enable a user to transition the panel into an open state, the open state defining an opening through the floor of the basin of sufficient size to allow the user to pass the materials therethrough.

The cabinet includes a cabinet-top opening at a location that enables it to be disposed beneath the opening through the floor of the basin, the cabinet-top opening having pass-through dimensions matching or of greater size than corresponding dimensions of the opening through the floor of the basin. The cabinet includes a sliding tray located below the cabinet-top opening while in a retracted state, the sliding tray adapted to be translated to an extended state defined by a location at least partially external to the cabinet. The cabinet may include a receptacle positioned on the tray in the retracted state to receive the materials passed through the opening through the floor of the basin, the receptacle having receptacle in-take dimensions that match dimensions of, or are greater than corresponding dimensions of, the opening through the floor of the basin.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 is a depiction of an embodiment of the cage used in conjunction with a cabinet or table.

DETAILED DESCRIPTION

A description of example embodiments follows.

Figure 1:
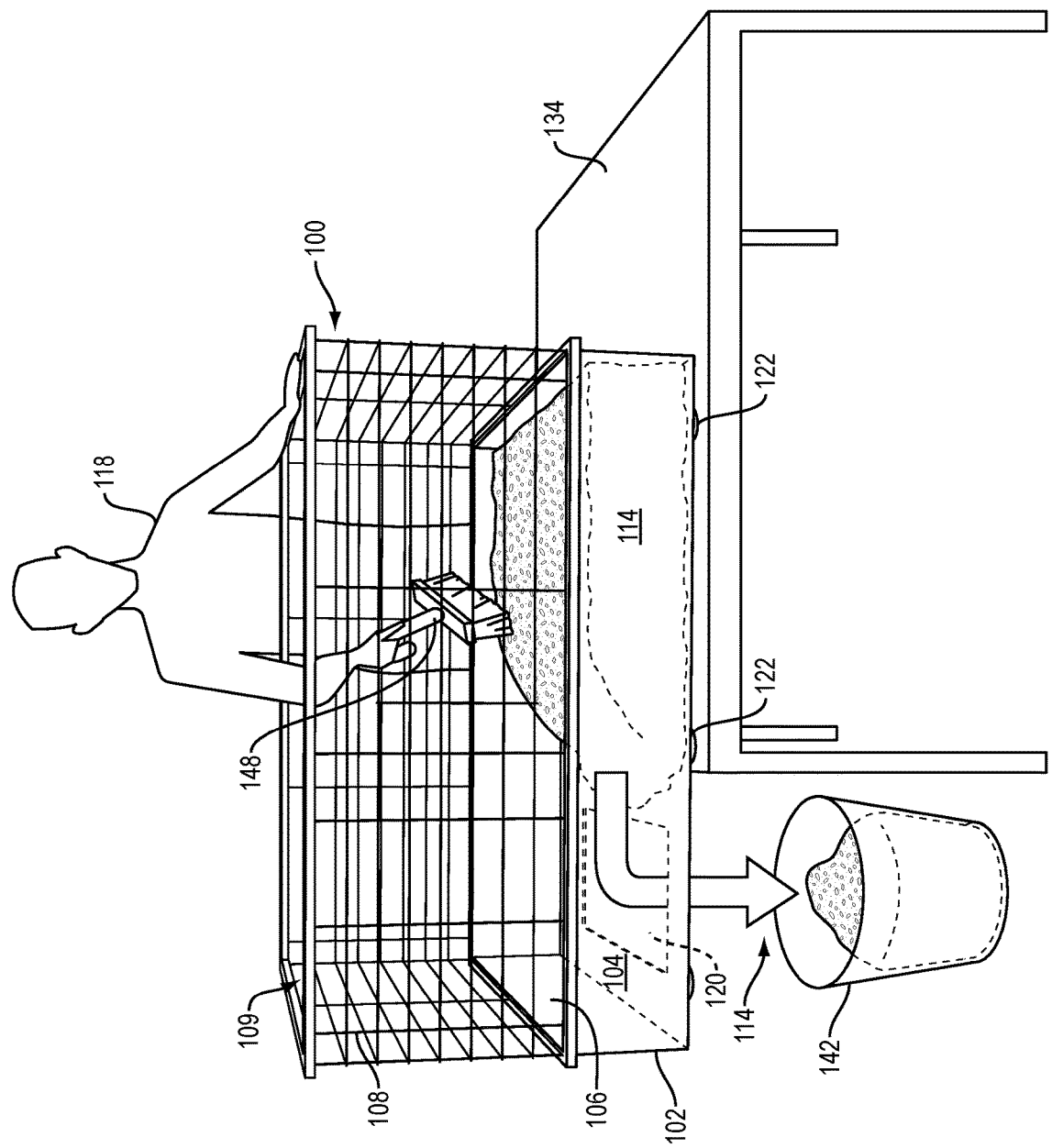
FIG. 1 is a depiction of a cage being cleaned using features of an example embodiment of the invention.

FIG. 1 shows an embodiment of a cage 100 according to the present disclosure. The cage 100 in FIG. 1 is depicted in a state of being cleaned. The cage 100 includes a basin 102 having a floor 104 and a wall perimeter 106. Extending upward from the wall perimeter 106 is a wire mesh 108. The basin 102 and the wire mesh 108 define an enclosure volume 109. The basin 102 is shown as being clear to portray features and actions inside of the enclosure volume 109 more easily; however, the basin may be made of either a transparent or opaque material. When the cage 100 is not in a state of being cleaned, the enclosure volume 109 is sufficient to contain a small animal and materials 114 for the small animal, such as shavings. Since the cage 100 is shown in FIG. 1 in a state of being cleaned, the animal is not shown, as the animal would have been previously removed from the cage.

A user 118 can be seen in FIG. 1 moving materials 114 across the floor 104 toward the basin 102 such that the materials 114 pass through an opening 120 through the basin 102. The opening 120 is shown in FIG. 1 as being located through the floor 104 of the basin 102, but the opening 120 can also be located through the wall perimeter 106 or through a combination of the floor 104 and the wall perimeter 106. The opening 120 may be covered by a panel defining a closed state. The panel is not shown in FIG. 1.

It should be understood that the user 118 in FIG. 1 has previously translated the cage partway across a surface of a table 134 upon which the cage rests such that the portion of the basin 102 containing the opening 120 is directly above a trash can 142, unobstructed by the surface of the table 134. The cage 100 has a length and a width, or alternatively and respectively a major axis and a minor axis, with weight distribution biased toward a given side along the length toward the perimeter of the cage 100 at least while the panel is in an open state. Such a weight distribution may be used to help keep the cage stable and level while the portion of the basin 102 containing the opening 120 remains suspended above a portion of floor or a trash can 142 placed thereon, and unsupported by the surface of the table 134. The weight distribution may be set by the inclusion of fixed ballasting elements attached to the basin 102 or another part of the cage 100. It should also be understood that the user 118 in FIG. 1 has previously interacted with the cage 100 to transition the panel into an open state to reveal the opening 120. The weight distribution may alternatively be set by inclusion of ballasting elements on the panel itself, such that the weight distribution of the cage 100 shifts as the panel is transitioned between the open and closed states. Mechanisms for transitioning the panel between the open state and a closed state are not shown in FIG. 1.

A plurality of feet 122 can be seen in FIG. 1 extending downward from the floor 104 of the basin 102 external from the enclosure volume 109. The feet 122 have a height dimension that positions the floor 104 above the surface of the table 134 to enable the user 118 to access the panel, or a control element mechanically coupled to the panel, to transition the panel between the closed and open states. The opening is of sufficient size to allow the user 118 to pass materials 114 therethrough. Materials passing through the opening 120 can be seen in FIG. 1 falling directly into the trash can 142 placed directly underneath the opening 120. The trash can is shown as being clear to more easily depict the materials 114 entering and settling inside the trash can 142. The trash can 142 may be replaced by any suitable receptacle for collecting the material 114 including used shavings and animal waste for disposal, including a garbage bag. The user 118 can be seen using a sweeper 148, such as a broom or a brush, to help translate materials 114 toward the opening 120.

Figure 2A:
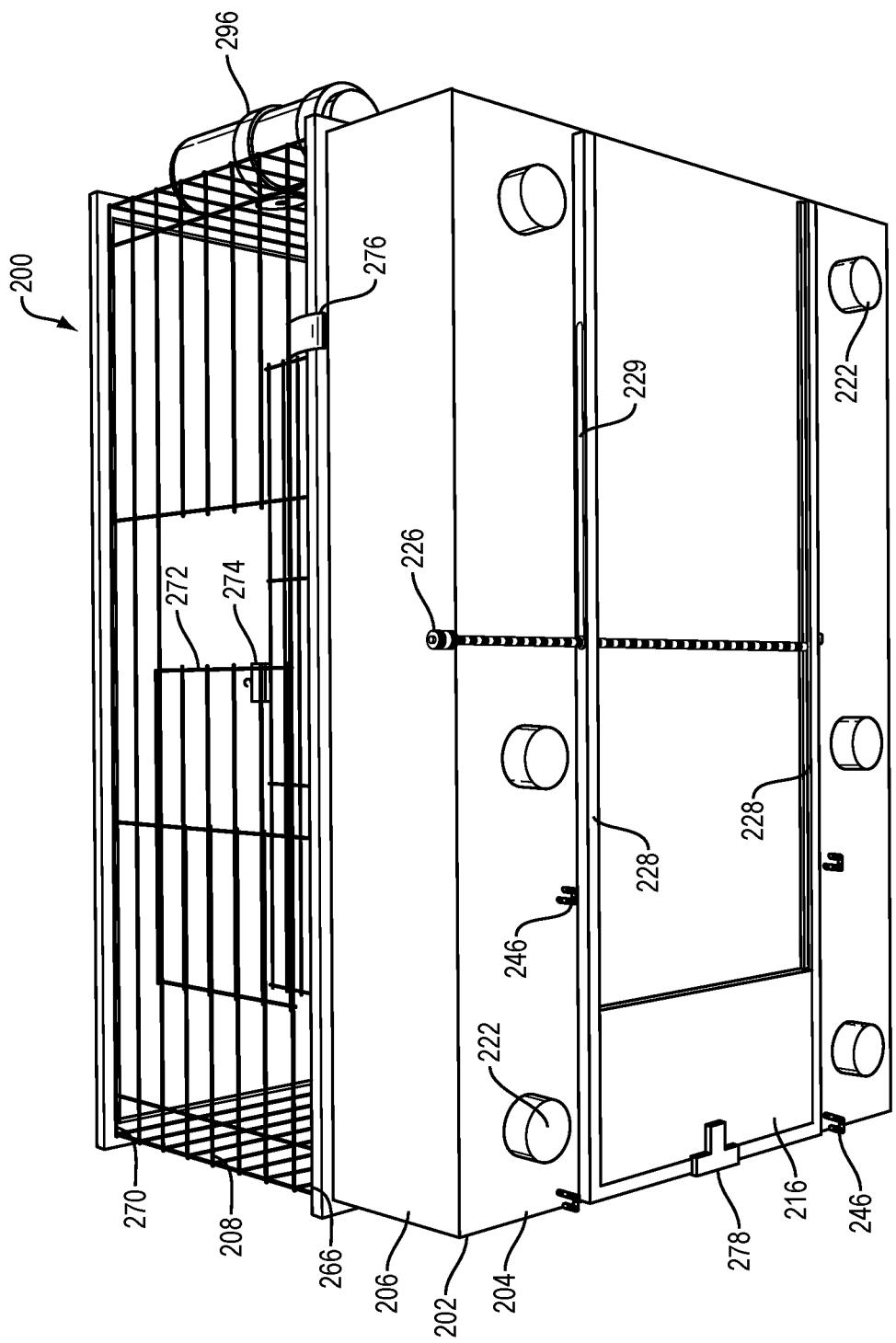
FIG. 2A is a rendering of an embodiment of the cage viewed from a 45° angle, illustrating features of exterior portions of the cage, including the floor.

FIG. 2A shows a cage 200 at a 45° angle such that most of the portion of the basin 202 external from the enclosure volume 109 is visible. The floor 204 and wall perimeter 206 are shown as defined by the basin 202. The wire mesh 208 is shown extending upward from the wall perimeter 206. The panel 216 is shown in FIG. 2A defining a portion of the floor 204 in a closed state. Alternatively, the panel could define a portion of the wall perimeter 206 in a closed state, or the panel could so define a combination of portions of the floor 204 and wall perimeter 206. In some embodiments, the panel 216 may be at least partially removable from the basin 202. For example, the panel 216 may have been attached to the basin 202 by one or more clips, latches, tabs, or hinges. The panel 216, once at least partially removed, could then be reattached to the basin 202.

In some embodiments, as shown in FIG. 2A, the panel may be actuated by movement of a control element 226. The control element may include a handle and a release button to prevent inadvertent transition of the panel 216 to an open state. In some embodiments, the control element may be connected to the panel via rods or wires running through a panel track 228. A user 118 may slide the control element through one or more slots 229 cut in the panel track 228.

Moving the control element 226 away from the portion of the basin 202 containing the opening 120 would pull the panel along the panel track 228, transitioning the panel to an open state. Likewise, moving the control element 226 back towards the portion of the basin 202 containing the opening 120 would push the panel along the panel track 228, transitioning the panel to a closed state. In some embodiments, the control element 226 may be located internal to or external from the enclosure volume 109.

Continuing to examine FIG. 2A, a plurality of feet 222 can be seen extending downward from the floor 204. In some embodiments, the plurality of feet 222 may include at least five feet 222 with a majority of the feet 222 positionally disposed along the length away from the given side toward which the weight distribution is biased. The phrase "a majority of the feet" allows for the possibility of a portion of a foot 222 extending over the center of mass such that "majority of the feet" is not treated as a countable or whole number. The plurality of feet 222 shown in FIG. 2A includes six feet 222, with four of the feet positioned within a half of the area of the floor 204 containing the panel 216, away from the half towards which the weight distribution is biased. A combination of a location of the panel 216, bias of the weight distribution, and positions of the majority of the feet may enable the cage to remain in a level orientation, with the floor occupying a plane that is parallel to the surface, while the cage is positioned with the panel in the open state such that the materials can flow freely through the opening without contacting the surface.

Also shown in FIG. 2A are a set of mechanical features 246 arranged to at least partially surround the panel 216. Four mechanical features are shown, but other embodiments may use more or fewer of these mechanical features 246. The mechanical features 246 may be shaped as hooks, or may be otherwise shaped to enable a garbage bag or other receptacle to be suspended therefrom and are separated by a distance sufficient to allow the garbage bag or other receptacle attached thereto to receive materials removed from the basin through the opening.

The feet 222 of FIG. 2A may include a material or mechanism to enable the user 118 to more easily translate or rotate the cage across a surface. The material or mechanism may include a felt pad, or a caster, wheel, or ball transfer. The material or mechanism is not shown in the figure. The basin 202 may feature a rim adjacent to the opening 120 and extending outward beyond a surface of the basin 202 external from the enclosure volume 109. The rim may extend toward a plane occupied by the panel 216 in the closed position. The rim may be positioned to close off any lateral space between the floor 204 of the basin 202 and the panel 216 when the panel is in the closed state. The rim also may facilitate transfer of material 114 to a receptacle located underneath the panel by stationarily sweeping material off of the surface of the panel 216 while the panel 216 is transitioned from the closed state to the open state.

The wire mesh 208 in FIG. 2A connects to the basin 204 at a proximal edge 266 opposite a distal edge 270 of the wire mesh. The wire mesh may include a side door 272. The side door may include a latch 274. The wire mesh and the basin may be held together by an element such as a clip 276 or multiple clips. A panel latching mechanism 278 may be employed to prevent accidental transition of the panel 216 to the open state. Upon transition of the panel 216 to the closed state, a latching mechanism 278 may automatically engage, or the panel may be secured by passing a detent. The detent is not shown. A water bottle 296 for a small animal may be affixed to the cage in a manner in which the water bottle does not interfere with transition of the panel 216 or generally with cleaning the cage 200. In addition, a canister of animal-safe cleaning wipes may be affixed to the cage 200 for convenience in sanitizing the interior of the cage following the removal of soiled materials 114 such as shavings from the cage 200. The canister of wipes is not shown.

Figure 2B:
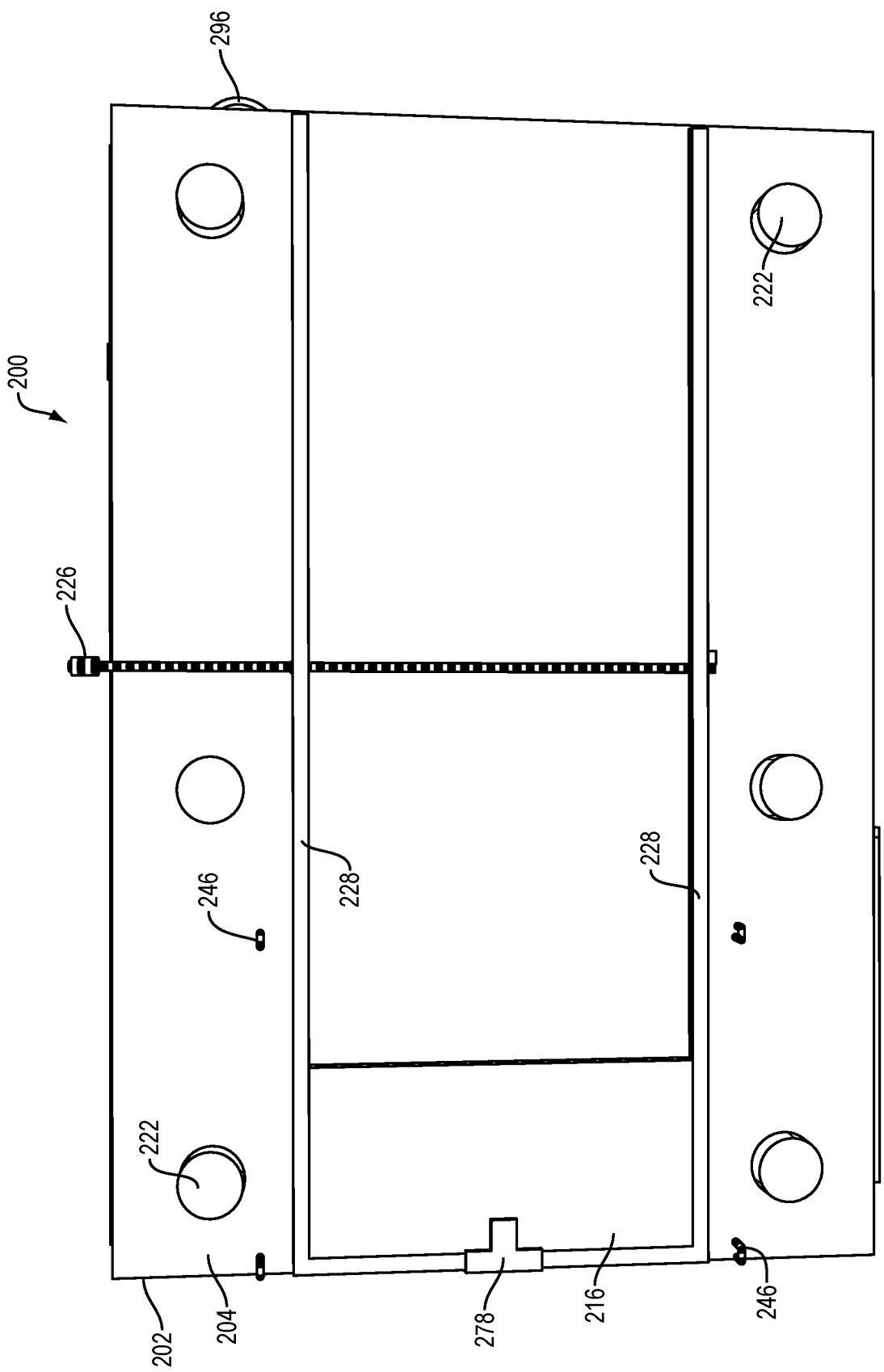
FIG. 2B is a rendering of the floor of an embodiment of the cage.

FIG. 2B shows a surface of the floor 204 of the basin 202 of the cage 200 external from the enclosure volume 109. The view of FIG. 2B is from directly below some embodiments of the cage 200.

Figure 2C:
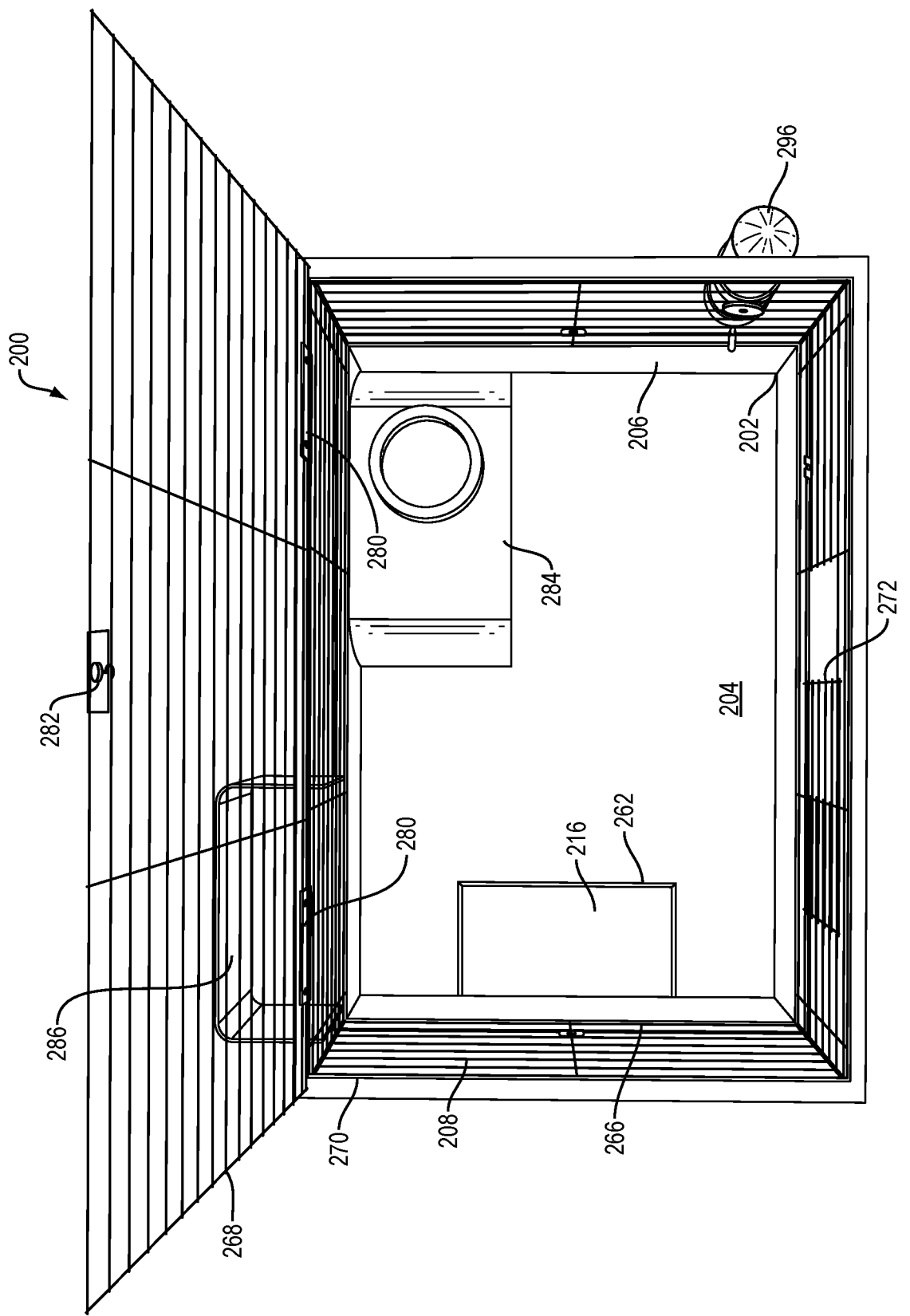
FIG. 2C is a rendering of an interior of an embodiment of the cage.

FIG. 2C shows a surface of the floor 204 of the basin 202 of the cage 200 internal to the enclosure volume 109. A surface of the basin 202 facing the enclosure volume 109 may include a chamfered region 262 adjacent to the panel 216, providing a downward slope towards the opening 120 to facilitate removal of materials 114 from the cage 200 through the opening 120. A roof element 268 may attach to the distal edge 270 of the wire mesh. Fasteners for the roof element may include hinges 280, a latch 282, or any other fasteners known in the art and appropriate for use an animal cage. The cage 200 may include a small house 284 for the animal. A hay rack 286 may be attached to the cage 200 in a manner so as not to interfere with transition of the panel 216.

Figure 2D:
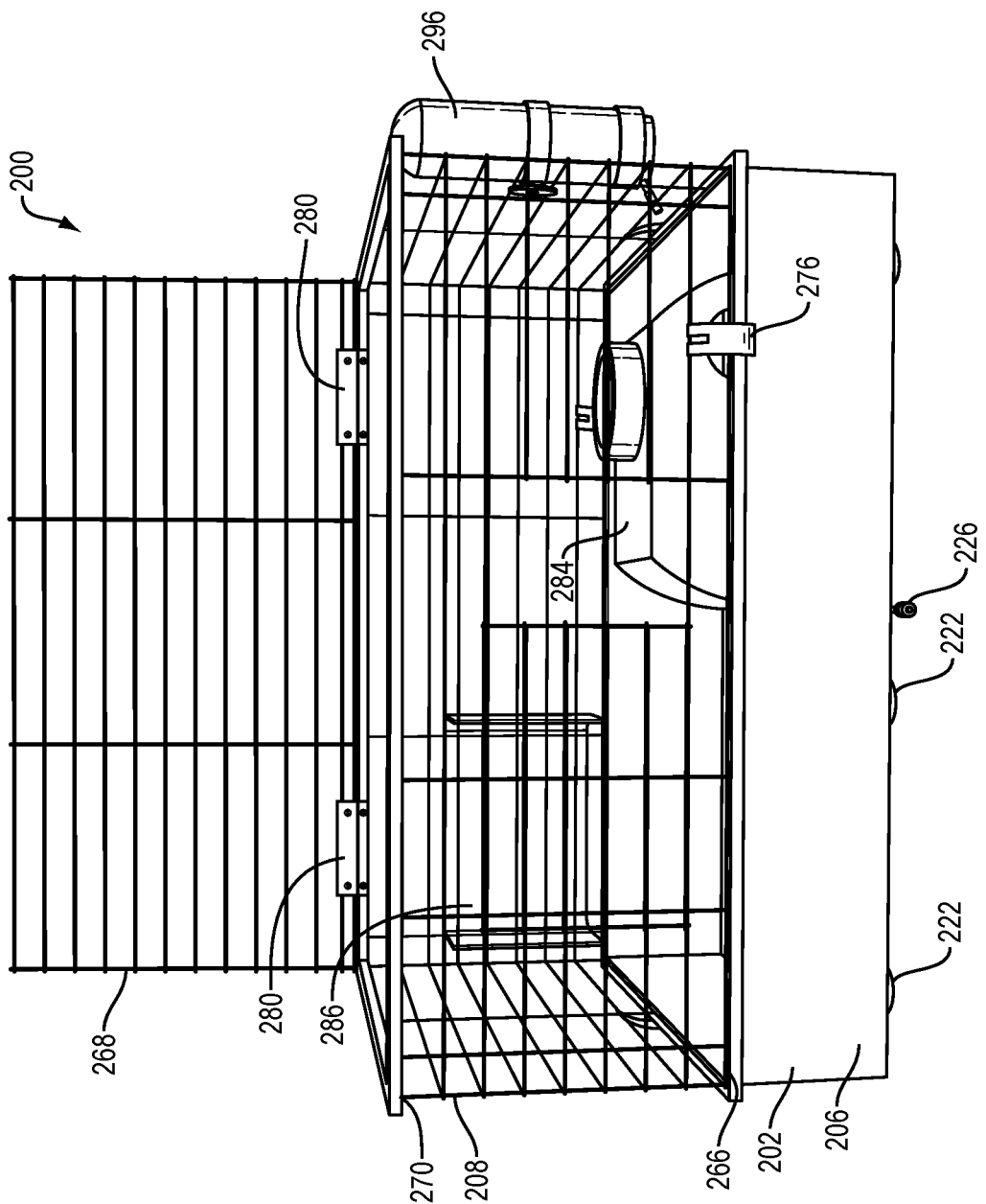
FIG. 2D is a rendering of another embodiment of the cage with particular features.

FIG. 2D shows the cage 200 at an angle that reveals portions of the basin 202 both internal to and external from the enclosure volume 109.

FIG. 3 depicts an embodiment of the cage 300 in an action of being raised from or lowered to a base for the cage 300 in the form of a cabinet 334. Cabinet and table are herein used as interchangeable terms. The cage 300 may be lowered to the cabinet 334 during an act of assembly, and may be raised from the cage during an act of disassembly. The acts of assembly or disassembly do not need to be performed to clean the cage 300, due to the presence of features described herein. A horizontal exterior surface or top surface of the cabinet 334 may include one or more vertical members 336 such as bumpers or guide fencing. The vertical members 336 may be positioned along an outer edge of the top surface of the cabinet to limit horizontal movement of the basin across or off of the top surface of the cabinet. Where previously described embodiments of the present systems included means for translating the cage across a surface to position a panel 216 above a receptacle 142, the embodiment depicted in FIG. 3 does not require horizontal translation of the cage 300 due to features to be described subsequently.

The cabinet 334 in FIG. 3 includes a cabinet-top opening 338 disposed beneath an opening 320 through the basin 202 of the cage 300 to allow materials 114 removed from the basin 202 through the opening 320 through the basin 202 of the cage 300 to flow freely into a receptacle 342 such as a trash can or garbage bag. The basin 202 is not depicted in FIG. 3 but may be present. The receptacle 342 may be located internal to the cabinet 334, or alternatively, between a number of legs of a table and beneath the surface of the table. Such positioning of the receptacle 342 uses space efficiently and promotes sanitary conditions within a room. A cabinet door 388 may further promote favorable conditions and keep the receptacle 342 hidden. The cabinet-top opening 338 may have a dimension matching the opening 120 through the basin 202 of the cage 300. The receptacle 342 would have an in-take dimension that matches a dimension of the opening 120.

Not shown in FIG. 3, but present in some embodiments, is a sliding tray located below the cabinet-top opening 338 while in a retracted state to allow the receptacle 342, while positioned on the sliding tray in the retracted state, to receive materials 114 removed from the basin 202 of the cage 300 through the opening 320 through the basin 202. The sliding tray may be adapted to be translated to an extended state. The extended state may be defined by a location at least partially external to the cabinet 334 such that the receptacle 342 may be lifted off of the sliding tray without interference from any portion of the cabinet 334.

The cabinet 334 may include drawers 390, shelves, or any other means of storage known in the art. The cabinet may include casters 392, wheels, or any other means of horizontal translation across a floor. A system 398 may comprise the cage 300 and the cabinet 334.

Figure 4:
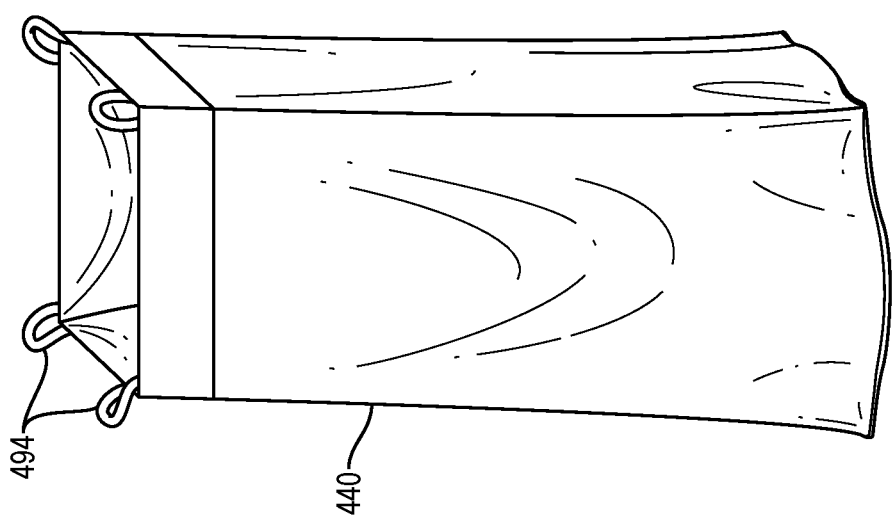
FIG. 4 is a depiction of a trash bag adapted to be used in conjunction with the cages of FIGS. 1-3.

FIG. 4 depicts an embodiment of a garbage bag 440 especially adapted for use with the cage 200. The garbage bag 440 includes a plurality of loops 494 along an open edge of the garbage bag 440. The loops 494 may be affixed to mechanical features 246 arranged to at least partially surround the panel 216. When the panel 216 is in an open state, materials 114 may be moved through the opening 120 defined by the panel 216 in the open state such that the materials 114 fall directly into the garbage bag 440. The garbage bag 440 would have a strength sufficient to withstand a predicted weight of the materials 114 while suspended from the cage 200. The garbage bag 440 would have an in-take dimension that matches a dimension of the opening 120.

Figure 5:
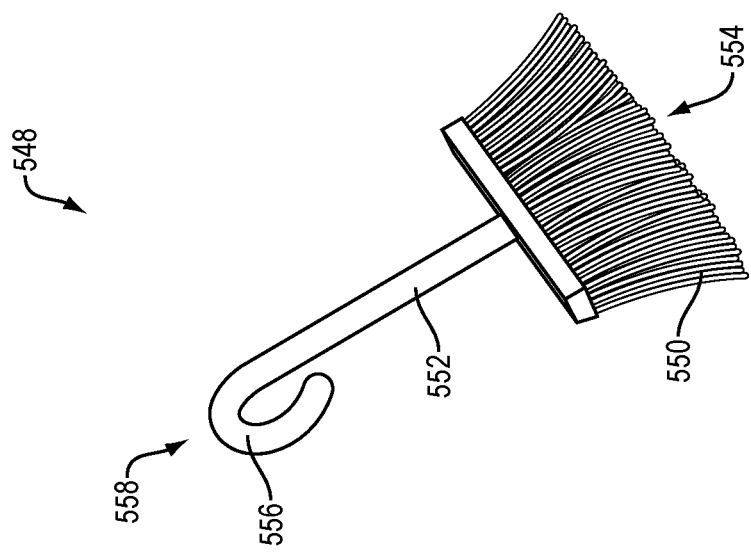
FIG. 5 is a depiction of a sweeper adapted to be used in conjunction with the cages of FIGS. 1-3.

FIG. 5 depicts an embodiment of a sweeper 548 especially adapted for use with the cage 200. The sweeper of FIG. 5 has bristles 550 connected to a shaft 552 at a sweeping end 554. The shaft 552 may include a hook element 556 or curved section located at a hanging end 558 enabling the sweeper 548 to be affixed to the wire mesh 208 at the hanging end 558 of the sweeper. The hook element 556 may allow a user 118 to remove the sweeper 548 from the wire mesh 208 such that the user 118 may employ the sweeper 548 in translating the materials 114 toward the opening 120.

In some embodiments, an integrated sweeper may be disposed inside the basin 202. A handle may be located external from the enclosure volume 190. A slot may be defined horizontally through part of the wall perimeter 204 of the basin 202. The integrated sweeper may be connected to the handle by a member passing through the slot. The integrated sweeper may be operable by a user 118 by actuating the handle to move materials 114 contained within the basin 202 toward the panel 216. The integrated sweeper may have a u- or v-shape that directs the materials 114 into the opening 120 when operated by the user 118 along a length of the basin 202 toward the panel 216 while in an open state. The integrated sweeper may have a length that extends across at least a portion of a width of the floor 204 of the basin 202. The integrated sweeper may be able to be rotated by the handle from a plane parallel to the floor 204 of the basin 202 to at least 30 degrees above the plane. Provisions may be made to allow the integrated sweeper to cover a maximum area of the floor 204 of the basin 202. Such provisions may include openings through the wall perimeter 208. An integrated sweeper is not shown in the figures of the present disclosure.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A cage system for housing a small animal, the cage system comprising a cage that includes:
   a basin defining a floor having a floor surface, a wall perimeter, and a wire mesh extending upward from the wall perimeter, the basin and wire mesh defining an enclosure volume sufficient to contain a small animal and materials for the small animal, the floor surface facing the enclosure volume including a chamfered region adjacent the opening;
   a panel defining a portion of the floor or wall perimeter in a closed state and configured to enable a user to transition the panel into an open state, the open state defining an opening through the floor or wall perimeter of sufficient size to allow the user to pass the materials therethrough.

2. The cage system of claim 1 wherein the basin includes a plurality of feet extending downward from the floor of the basin external from the enclosure volume, the plurality of feet having a height dimension that positions the floor above a surface at a sufficient distance from the surface to enable a user to access the panel or a control element mechanically coupled to the panel to transition the panel between the closed state and the open state.

3. The cage system of claim 2 wherein the panel is slidably operable along a panel track integrated with or coupled to the basin.

4. The cage system of claim 2 wherein the cage has a length and width with weight distribution biased toward a given side along the length toward the perimeter of the cage at least while the panel is in the open state, and wherein the plurality of feet includes at least five feet with a majority of the feet positionally disposed along the length away from the given side.

5. The cage system of claim 4 wherein a combination of a location of the panel, bias of the weight distribution, and positions of the majority of the feet enables the cage to remain in a level orientation, with the floor occupying a plane that is parallel to the surface, while the cage is positioned with the panel in the open state such that the materials can flow freely through the opening without contacting the surface.

6. The cage system of claim 2 wherein the feet include a mechanism or material to enable the user to translate or rotate the cage on a surface.

7. The cage system of claim 1 wherein the panel defines the opening through the floor of the basin in the open state.

8. The cage system of claim 7 further comprising a cabinet, the basin sized to rest atop the cabinet, the cabinet including one or more vertical members positioned along an outer edge of a top surface of the cabinet, the vertical members configured to limit horizontal movement of the basin across or off of the top surface of the cabinet, the cabinet further including a cabinet-top opening disposed beneath the opening through the floor of the basin to allow materials removed from the basin through the opening through the floor of the basin to flow freely into a garbage bag or other receptacle located internal to the cabinet, the cabinet-top opening having pass-through dimensions matching or of greater size than a corresponding dimension of the opening through the floor of the basin.

9. The cage system of claim 8 further comprising a sliding tray located below the cabinet-top opening while in a retracted state to allow a receptacle positioned on the tray in the retracted state to receive materials removed from the basin through the opening through the floor of the basin, the sliding tray adapted to be translated to an extended state defined by a location at least partially external to the cabinet such that the receptacle may be lifted off of the tray without interference from the cabinet.

10. The cage system of claim 1 wherein the panel is configured to be at least partially removed from the basin to transition the panel into the open state, and wherein the panel is further configured to be reattached to the basin to transition the panel into the closed state.

11. The cage system of claim 1 further comprising at least two mechanical features mounted at a location external from the enclosure volume and adjacent to the opening defined by the panel while in the open state, wherein the at least two mechanical features have shapes that enable a garbage bag or other receptacle to be suspended therefrom and are separated by a distance sufficient to allow the garbage bag or other receptacle attached thereto to receive materials removed from the basin through the opening.

12. The cage system of claim 1 further comprising a sweeper having bristles of sufficient stiffness to translate materials in the cage along the floor of the basin, the bristles connected to a shaft at a sweeping end, the shaft including a hook element located at a hanging end that is opposite to the sweeping end, the hook element having a curvature that allows the hook element to suspend the sweeper from a portion of the wire mesh.

13. The cage system of claim 1 further comprising a rim adjacent to the opening and extending outward beyond a surface of the basin external from the enclosure volume, the rim extending toward a plane occupied by the panel in the closed position.

14. The cage system of claim 1 wherein the wire mesh is coupled to the basin at a proximal edge and further comprising a roof element adapted to be positioned on the wire mesh at a distal edge of the wire mesh.

15. A cage for containing a small animal, the cage comprising:
   means for containing the small animal and materials for the small animal in an enclosure volume; and
   means for changing a state of an opening, the opening having a chamfered edge, in said means for containing that enables a user to translate the materials or a portion thereof from within the enclosure volume to outside of the enclosure volume without tipping or tilting the cage.

16. A kit comprising:
   a cage configured to contain a small animal and materials for the small animal in an enclosure volume, the cage further configured to allow a user to sweep the materials for the small animal out of the enclosure volume through an opening through the cage;
   a sweeper having bristles connected to a shaft at a sweeping end, the shaft including a hook element or a curved section located at a hanging end that is opposite to the sweeping end, the hook element or curved section enabling the sweeper to be affixed to the wire mesh, the sweeper configured to be removed from the wire mesh and employed by the user to sweep the materials for the small animal out of the enclosure volume through the opening through the cage;
   a receptacle configured to be below the opening through the cage to receive materials removed from the cage through the opening of the cage, the receptacle having receptacle in-take dimensions that matches a dimension of the opening through the cage; and
   a cabinet, the cage sized to rest atop the cabinet, the cabinet including one or more vertical members positioned along an outer edge of a top surface of the cabinet and configured to limit horizontal movement of the cage across or off of the top surface of the cabinet, the cabinet further including a cabinet-top opening disposed beneath the opening through the cage to allow materials removed from the cage through the opening through the cage to flow freely into the bag or other receptacle located internal to the cabinet, the cabinet-top opening having pass-through dimensions matching the opening through the cage.

17. The kit of claim 16 wherein the receptacle is a bag configured to be affixed to the cage beneath the opening to receive the materials for the small animal, the bag having a strength sufficient to withstand a predicted weight of the materials while affixed to the cage.

18. A system for housing a small animal, the system comprising:
    a cage comprising:
        a basin defining a floor and wall perimeter and a wire mesh extending upward from the wall perimeter, the basin and wire mesh defining an enclosure volume sufficient to contain a small animal and materials for the small animal; and
        a panel defining a portion of the floor or wall perimeter in a closed state and configured to enable a user to transition the panel into an open state, the open state defining an opening through the floor of the basin of sufficient size to allow the user to pass the materials therethrough; and
    a cabinet comprising:
        a cabinet-top opening disposed beneath the opening through the floor of the basin, the cabinet-top opening having pass-through dimensions matching the opening through the floor of the basin;
        a sliding tray located below the cabinet-top opening while in a retracted state, the sliding tray adapted to be translated to an extended state defined by a location at least partially external to the cabinet; and
        a receptacle positioned on the tray in the retracted state to receive the materials passed through the opening through the floor of the basin, the receptacle having receptacle in-take dimensions that matches a dimension of the opening through the floor of the basin.

19. A cage system for housing a small animal, the cage system comprising a cage that includes:
    a basin defining a floor, a wall perimeter and a wire mesh extending upward from the wall perimeter, the basin and wire mesh defining an enclosure volume sufficient to contain a small animal and materials for the small animal;
    a panel defining a portion of the floor or wall perimeter in a closed state and configured to enable a user to transition the panel into an open state, the open state defining an opening through the floor or wall perimeter of sufficient size to allow the user to pass the materials therethrough; and
    a cabinet, the basin sized to rest atop the cabinet, the cabinet including one or more vertical members positioned along an outer edge of a top surface of the cabinet, the vertical members configured to limit horizontal movement of the basin across or off of the top surface of the cabinet, the cabinet further including a cabinet-top opening disposed beneath the opening through the floor of the basin to allow materials removed from the basin through the opening through the floor of the basin to flow freely into a garbage bag or other receptacle located internal to the cabinet, the cabinet-top opening having pass-through dimensions matching or of greater size than a corresponding dimension of the opening through the floor of the basin.

20. The cage system of claim 19 further comprising a sliding tray located below the cabinet-top opening while in a retracted state to allow a receptacle positioned on the tray in the retracted state to receive materials removed from the basin through the opening through the floor of the basin, the sliding tray adapted to be translated to an extended state defined by a location at least partially external to the cabinet such that the receptacle may be lifted off of the tray without interference from the cabinet.

21. A cage system for housing a small animal, the cage system comprising a cage that includes:
    a basin defining a floor, a wall perimeter, and a wire mesh extending upward from the wall perimeter, the basin and wire mesh defining an enclosure volume sufficient to contain a small animal and materials for the small animal;
    a panel defining a portion of the floor or wall perimeter in a closed state and configured to enable a user to transition the panel into an open state, the open state defining an opening through the floor or wall perimeter of sufficient size to allow the user to pass the materials therethrough;
    the basin including a plurality of feet extending downward from the floor of the basin external from the enclosure volume, the plurality of feet having a height dimension that positions the floor above a surface at a sufficient distance from the surface to enable a user to access the panel or a control element mechanically coupled to the panel to transition the panel between the closed state and the open state; and
    the cage having a length and width with weight distribution biased toward a given side along the length toward the perimeter of the cage at least while the panel is in the open state, and wherein the plurality of feet includes at least five feet with a majority of the feet positionally disposed along the length away from the given side.

22. The cage system of claim 21 wherein the feet include a mechanism or material to enable the user to translate or rotate the cage on a surface.

23. A cage system for housing a small animal, the cage system comprising a cage that includes:
    a basin defining a floor, a wall perimeter, and a wire mesh extending upward from the wall perimeter, the basin and wire mesh defining an enclosure volume sufficient to contain a small animal and materials for the small animal;
    a panel defining a portion of the floor or wall perimeter in a closed state and configured to enable a user to transition the panel into an open state, the open state defining an opening through the floor or wall perimeter of sufficient size to allow the user to pass the materials therethrough;
    the basin including a plurality of feet extending downward from the floor of the basin external from the enclosure volume, the plurality of feet having a height dimension that positions the floor above a surface at a sufficient distance from the surface to enable a user to access the panel or a control element mechanically coupled to the panel to transition the panel between the closed state and the open state;
    the cage having a length and width with weight distribution biased toward a given side along the length toward the perimeter of the cage at least while the panel is in the open state, and wherein the plurality of feet includes at least five feet with a majority of the feet positionally disposed along the length away from the given side; and a combination of a location of the panel, bias of the weight distribution, and positions of the majority of the feet enabling the cage to remain in a level orientation, with the floor occupying a plane that is parallel to the surface, while the cage is positioned with the panel in the open state such that the materials can flow freely through the opening without contacting the surface.

24. A cage system for housing a small animal, the cage system comprising a cage that includes:

a basin defining a floor, a wall perimeter, and a wire mesh extending upward from the wall perimeter, the basin and wire mesh defining an enclosure volume sufficient to contain a small animal and materials for the small animal;

a panel defining a portion of the floor or wall perimeter in a closed state and configured to enable a user to transition the panel into an open state, the open state defining an opening through the floor or wall perimeter of sufficient size to allow the user to pass the materials therethrough; and the basin including a plurality of feet extending downward from the floor of the basin external from the enclosure volume, the plurality of feet having a height dimension that positions the floor above a surface at a sufficient distance from the surface to enable a user to access the panel or a control element mechanically coupled to the panel to transition the panel between the closed state and the open state, the feet including a mechanism or material to enable the user to translate or rotate the cage on a surface.

25. The cage system of claim 24 further comprising a sliding tray located below the cabinet-top opening while in a retracted state to allow a receptacle positioned on the tray in the retracted state to receive materials removed from the basin through the opening through the floor of the basin, the sliding tray adapted to be translated to an extended state defined by a location at least partially external to the cabinet such that the receptacle may be lifted off of the tray without interference from the cabinet.

26. A cage system for housing a small animal, the cage system comprising a cage that includes:

a basin defining a floor, a wall perimeter, and a wire mesh extending upward from the wall perimeter, the basin and wire mesh defining an enclosure volume sufficient to contain a small animal and materials for the small animal;

a panel defining a portion of the floor or wall perimeter in a closed state and configured to enable a user to transition the panel into an open state, the open state defining an opening through the floor or wall perimeter of sufficient size to allow the user to pass the materials therethrough; and at least two mechanical features mounted at a location external from the enclosure volume and adjacent to the opening defined by the panel while in the open state, the at least two mechanical features having shapes that enable a garbage bag or other receptacle to be suspended therefrom and are separated by a distance sufficient to allow the garbage bag or other receptacle attached thereto to receive materials removed from the basin through the opening.

27. A cage system for housing a small animal, the cage system comprising a cage that includes:

a basin defining a floor, a wall perimeter, and a wire mesh extending upward from the wall perimeter, the basin and wire mesh defining an enclosure volume sufficient to contain a small animal and materials for the small animal;

a panel defining a portion of the floor or wall perimeter in a closed state and configured to enable a user to transition the panel into an open state, the open state defining an opening through the floor or wall perimeter of sufficient size to allow the user to pass the materials therethrough; and a sweeper having bristles of sufficient stiffness to translate materials in the cage along the floor of the basin, the bristles connected to a shaft at a sweeping end, the shaft including a hook element located at a hanging end that is opposite to the sweeping end, the hook element having a curvature that allows the hook element to suspend the sweeper from a portion of the wire mesh.

28. A cage system for housing a small animal, the cage system comprising a cage that includes:

a basin defining a floor, a wall perimeter, and a wire mesh extending upward from the wall perimeter, the basin and wire mesh defining an enclosure volume sufficient to contain a small animal and materials for the small animal;

a panel defining a portion of the floor or wall perimeter in a closed state and configured to enable a user to transition the panel into an open state, the open state defining an opening through the floor or wall perimeter of sufficient size to allow the user to pass the materials therethrough; and a rim adjacent to the opening and extending outward beyond a surface of the basin external from the enclosure volume, the rim extending toward a plane occupied by the panel in the closed position.

29. A cage system for housing a small animal, the cage system comprising a cage that includes:

a basin defining a floor, a wall perimeter, and a wire mesh extending upward from the wall perimeter, the basin and wire mesh defining an enclosure volume sufficient to contain a small animal and materials for the small animal;

a panel defining a portion of the floor or wall perimeter in a closed state and configured to enable a user to transition the panel into an open state, the open state defining an opening through the floor or wall perimeter of sufficient size to allow the user to pass the materials therethrough; and the wire mesh being coupled to the basin at a proximal edge and further comprising a roof element adapted to be positioned on the wire mesh at a distal edge of the wire mesh.

30. A cage system for housing a small animal, the cage system comprising a cage that includes:

a basin defining a basin floor, a wall perimeter and a wire mesh extending upward from the wall perimeter, the basin and wire mesh defining an enclosure volume sufficient to contain a small animal and materials for the small animal;

a panel defining a portion of the basin floor or wall perimeter in a closed state and configured to enable a user to transition the panel into an open state, the open state defining an opening through the basin floor or wall perimeter of sufficient size to allow the user to pass the materials therethrough; and a cabinet, the basin sized to rest atop the cabinet, the cabinet including one or more vertical members positioned along an outer edge of a top surface of the cabinet, the vertical members configured to limit horizontal movement of the basin across or off of the top surface of the cabinet.

* * * * *